United States Patent
Vasudevan et al.

(10) Patent No.: US 10,565,624 B2
(45) Date of Patent: Feb. 18, 2020

(54) ASSET ORCHESTRATION ACROSS MULTIPLE DEVICE TYPES, MEDIA SPACES, AND TIME

(71) Applicant: ARRIS Enterprises, Inc., Suwanee, GA (US)

(72) Inventors: Venugopal Vasudevan, Palatine, IL (US); Jehan Wickramasuriya, St. Charles, IL (US); Myungcheol Doo, Naperville, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 978 days.

(21) Appl. No.: 14/876,373

(22) Filed: Oct. 6, 2015

(65) Prior Publication Data

US 2017/0098246 A1  Apr. 6, 2017

(51) Int. Cl.
*G06Q 30/02* (2012.01)
(52) U.S. Cl.
CPC ................ *G06Q 30/0267* (2013.01)
(58) Field of Classification Search
CPC .................................................... G06Q 30/02
USPC ............................ 705/28; 707/722; 709/231
See application file for complete search history.

(56) References Cited

U.S. PATENT DOCUMENTS

| | | | | |
|---|---|---|---|---|
| 9,423,928 | B1* | 8/2016 | Bolfo | G06F 3/0482 |
| 9,699,502 | B1* | 7/2017 | Sandholm | H04N 21/442 |
| 2007/0198327 | A1* | 8/2007 | Yazdani | G06Q 10/087 |
| | | | | 705/28 |
| 2009/0287841 | A1* | 11/2009 | Chapweske | H04L 65/4084 |
| | | | | 709/231 |
| 2013/0218676 | A1 | 8/2013 | Ahrens et al. | |
| 2013/0262225 | A1 | 10/2013 | Ahrens et al. | |
| 2014/0258268 | A1* | 9/2014 | Woods | G11B 27/10 |
| | | | | 707/722 |

OTHER PUBLICATIONS

"Taking Care of Business, on All Screens", www.nielsen.com/us/en/insights/news/2013/taking-care-of-business--on-all-screens.html, Aug. 7, 2013, Nielsen Newswire.

* cited by examiner

*Primary Examiner* — Marilyn G Macasiano
(74) *Attorney, Agent, or Firm* — Chernoff, Valhauer, McClung & Stenzel, LLP (57) ABSTRACT

Particular embodiments provide a system to support orchestration of media assets that are delivered across multiple media spaces, time, and multiple device types in a coordinated manner. The system exposes a sequence of media assets to a user under media space, time, and device constraints. A campaign may be broken up into multiple media assets (e.g., different creatives, such as advertisement creatives). To target a user across different media spaces, the system may generate spanning rules based on metadata concerning multiple media spaces, time, and multiple device types for the campaign. An analytics service may provide analytics information for the delivered media assets to allow the coordination to continue in the sequence. Also, the analytics information may be used to change the spanning rules for future delivery of media assets.

20 Claims, 7 Drawing Sheets

ASSET ORCHESTRATION ACROSS MULTIPLE DEVICE TYPES, MEDIA SPACES, AND TIME

BACKGROUND

Second screen solutions are growing at a rapid rate. The second screen solutions display second screen content on second screen devices while a user watches first screen content on a first screen device. For example, a user may watch a television show on a television and receive supplemental content on a mobile device. The second screen may be used to provide advertising that can supplement the first screen content being shown on the first screen device. For example, advertisers may diversify their investment in television advertising to reach more of their users that are consuming media on multiple different second screen devices.

Typically, the ad strategy for an advertiser is fragmented across the multiple media spaces in which advertisements may be sent. These media spaces include mobile, television, social, web, web video, and other media. Creating different ad campaigns for each of these media spaces may be costly. Due to the cost, some advertisers may not be able to create ad campaigns for all of the media spaces. Even when advertisers do create different ad campaigns for the different media spaces, typically, the ad campaigns in each space are run independently.

DETAILED DESCRIPTION

Described herein are techniques for a media asset orchestration system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments provide a system to support orchestration of media assets that are delivered across multiple media spaces, time, and multiple device types in a coordinated manner. The system exposes a sequence of media assets to a user under media space, time, and device constraints. A campaign may be broken up into multiple media assets (e.g., different creatives, such as advertisement creatives). To target a user across different media spaces, the system may generate spanning rules based on metadata concerning multiple media spaces, time, and multiple device types for the campaign. An analytics service may provide analytics information for the delivered media assets to allow the coordination to continue in the sequence. Also, the analytics information may be used to change the spanning rules for future delivery of media assets. An advertising ecosystem with a story-oriented, in-line (with the content, or native advertising) narrative is more desirable over traditional singular, static ad placements. Using mobile devices and wearable devices with contextual user data, particular embodiments are able to sequence multiple pieces of an ad campaign.

Overview

Figure 1:
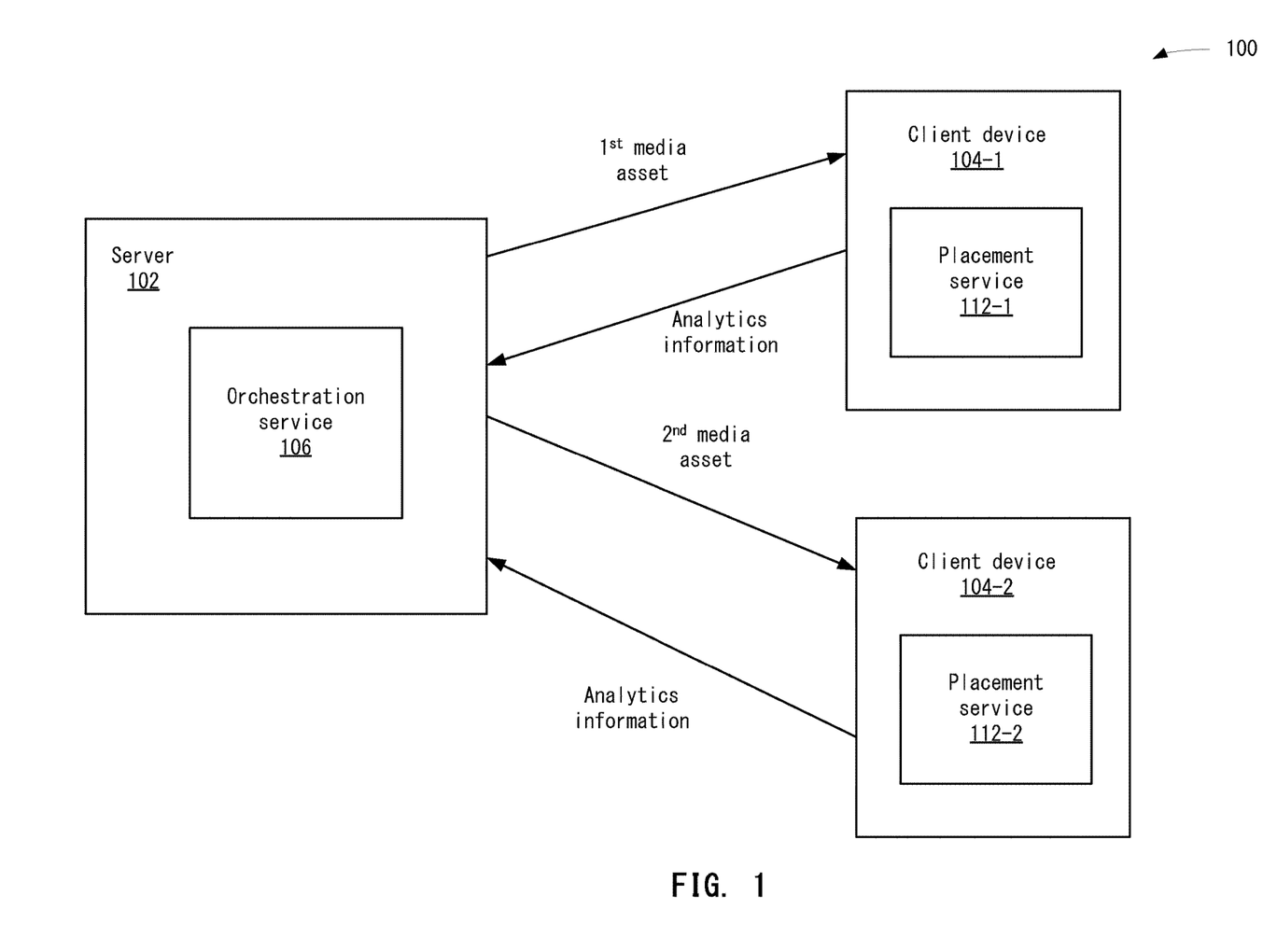
FIG. 1 depicts a simplified system for orchestrating delivery of media assets according to one embodiment.

FIG. 1 depicts a simplified system 100 for orchestrating delivery of media assets according to one embodiment. System 100 includes a server 102 and multiple client devices 104-1-104-2. Although a single instance of server 102 is shown, multiple servers may be used, and also different numbers of client devices 104 may be provided. Client devices 104 may include different kinds of computing devices, such as first screen devices and second screen devices. First screen devices may a primary screen a user is watching, such as a television, and second screen devices may be a secondary screen, such as a mobile device or wearable device. The orchestration may be performed across any combination of devices and may be on solely first screen devices, solely second screen devices, or both types.

Server 102 includes an orchestration service 106 that provides a system that can orchestrate delivery of media assets that may span multiple different device types of client devices 104 and media spaces. For example, orchestration service 106 may coordinate an advertisement (ad) story across multiple different media spaces, time, and multiple device types.

The media space may be an area, such as mobile, television, social, web, web video, and other media. A media space may be a different way of contacting a user. The different media spaces may use different device types or the same device type. For example, the television media space delivers a media asset through a television network to a television, a mobile media space delivers a media asset through a mobile channel to a mobile device, a social network media space may deliver a media asset to a user's social network application via different communication channels, such as the Internet, to different devices.

The time aspect may be the sequencing of media assets for delivery and time aspects related to the sequence. For example, an elapsed time or "time to live" may keep track of how long a current advertisement in the sequence has been eligible for delivery. Once a media asset become eligible, there may be time limits in the sequence that specify the current advertisement should be delivered within an elapsed time, such as 24 hours after the last viewed media asset. This can also be quantified as a time to live, or the advertisement has two hours to be delivered or it cannot be shown. The time aspect may also be used to prioritize the delivery of media assets in placement opportunities among different campaigns. For example, a current media asset that only has 1 hour to live, may be shown over a media asset that has 24 hours to live.

The device type may be constraints in which device type may be used to deliver media assets. For example, the device type constraint may specify a mobile device, a television, an application, a social network, etc. The device type may also specify more specific device constraints, such as operating system, size, display resolution, etc.

The media asset may be information that is to be conveyed to a user, such as an advertisement. For example, the media asset may be video, images, text, or audio. The media assets may be grouped together in a campaign that spans the media spaces, time, and device type constraints.

Orchestration service 106 may orchestrate the delivery of different media assets to different client devices 104. The delivery of the media assets may be based on spanning rules, which may define a sequence of different media assets that should be sent based on interactions across multiple media spaces, multiple devices, or time.

Client devices 104 each include a media asset placement service 112 that helps coordinate the orchestration. For example, client devices 104 provide analytics information to orchestration service 106. The analytics information may include confirmations that a media asset has been displayed and watched on a client device by a user. For example, a media asset placement service 112-1 on client device 104-1 may determine analytics information for the display of a first media asset on client device 104-1. In one example, client device 104-1 may be a television that displays a television advertisement first. Media asset placement service 112-1 can then send information to orchestration service 106 indicating that the user has watched the first advertisement and at what time the media asset was viewed.

Orchestration service 106 may then process the delivery and viewing of the first advertisement and determine a second advertisement to send based on the rules. As will be discussed below, certain rules may be used to determine the next advertisement to be sent. For discussion purposes, a second advertisement in a different media space may be sent to client device 104-2. In this case, client device 104-2 may be a smartphone or other mobile device. This second advertisement may be sent after the viewing of the first advertisement and within a time limit, such as an hour to twenty-four hours after. Media asset placement service 112-2 may register the display and viewing of the second advertisement and provide analytics information confirming the viewing to orchestration service 106. Orchestration service 106 may then determine the next advertisement, if any, to provide to the user.

Orchestration service 106 may also use the analytics information to adjust the spanning rules. For example, the sequence of delivery of media assets may be changed if analytics information indicates it may be better to deliver a media asset before another media asset.

Server

Figure 2:
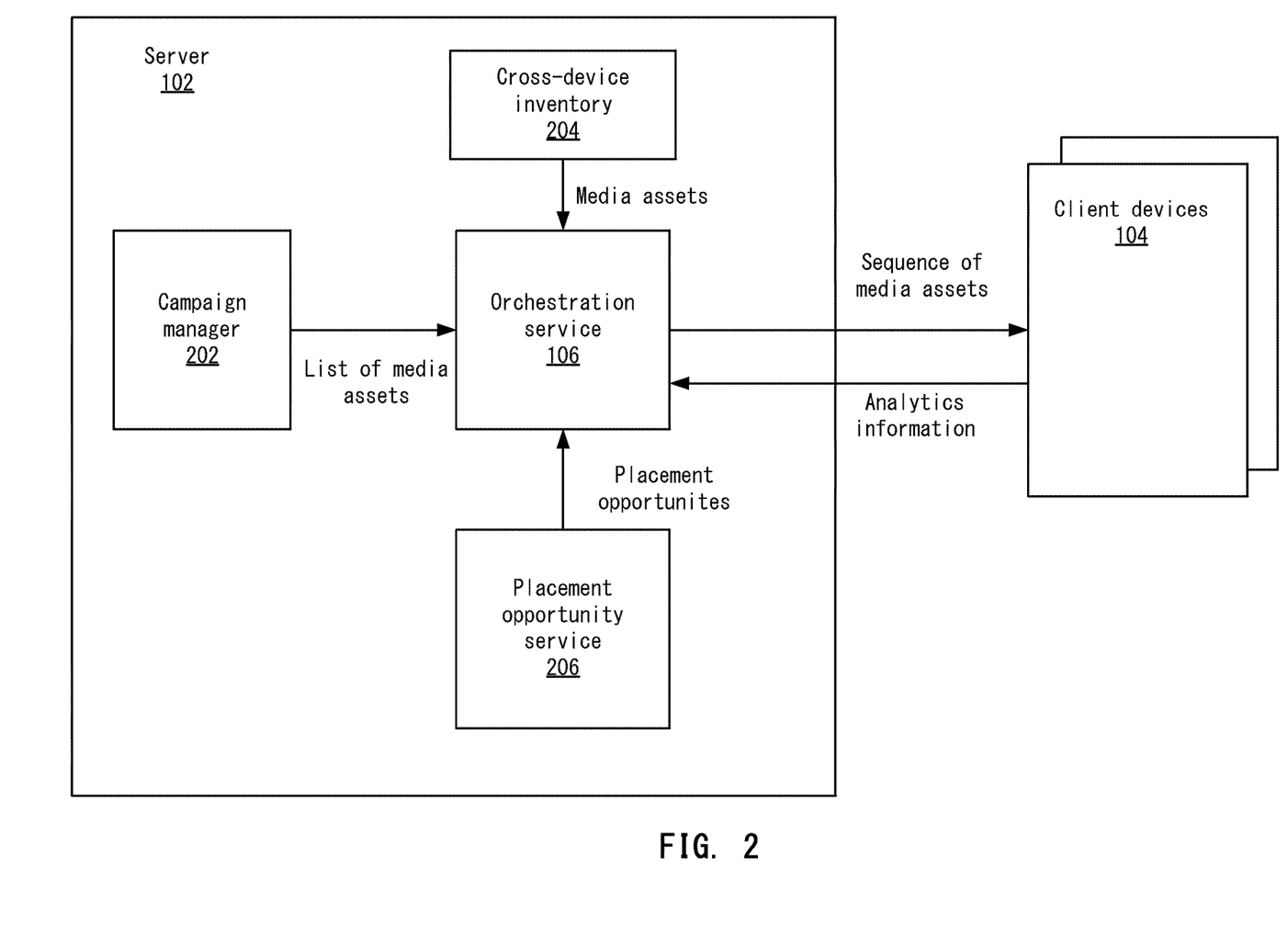
FIG. 2 depicts a more detailed example of a server according to one embodiment.

FIG. 2 depicts a more detailed example of server 102 according to one embodiment. Server 102 includes a campaign manager 202, a cross-device ad inventory 204, orchestration service 106, and a placement opportunity service 206.

Cross-device inventory 204 may maintain an inventory of various media assets in ad campaigns. These may be the actual media assets, such as the videos, images, web pages, etc., that are delivered to client devices 104. The media assets may be configured differently based on different media spaces and/or client device specifications. For example, there may be television media assets, mobile media assets, media assets for social networks, etc. The media assets may be stored in a storage device in cross-device ad inventory 204.

The media assets may have media asset metadata specified and associated with each media asset. The metadata may include media asset characteristics that describe each asset, such as the media type, resolution, and device type formatting, and other information that describes the media asset.

Also, various constraints may be included in the metadata, such as desired client device types and placement, temporal or timing constraints (e.g., an image-based media asset should be sent before a video media asset). This media asset metadata allows the retrieval of specific media assets for a campaign that spans the multiple media spaces, multiple device types, and time.

Campaign manager 202 may generate a list of media assets, which may be different ad creatives for different media spaces and device types for a campaign. The media assets may be grouped per ad campaign. Each different campaign may have its own group of media assets. For example, a campaign may specify a sequence of different media assets to be delivered for different media spaces and/or device types. For example, a first ad creative may be a television commercial; a second ad creative may be a mobile advertisement; and a third ad creative may be an offer sent via a social network. The different media assets may be sent via different communication channels to different types of client devices 104.

The list of media assets includes sequencing metadata associated with each campaign that specifies timing information for the list of media assets, such as an order in which the media assets should be delivered to a user. The sequencing metadata may expose time constraints, such as elapsed times, time to live, or other timing information that can be used to determine or prioritize when to deliver media assets in the sequence.

The list of media assets also includes device placement metadata that specifies the device types to expose the media assets. For example, the device placement may progress from television device type, a mobile device type, to a social network device type. Other device placement metadata may be the characteristics of a device, such as resolution.

The sequencing metadata and device placement metadata may be matched with the media assets in cross-device inventory 204. For example, orchestration engine 106 may retrieve media assets in cross-device inventory 204 that meet the campaign requirements based on the metadata. This may involve comparing sequencing metadata and device placement metadata to media asset metadata to determine the right media assets in cross-device inventory 204.

Orchestration service 106 may include a rules engine and rules database that may maintain a set of rules that can be used to orchestrate the sending of the media assets for an ad campaign. Orchestration service 106 may generate the rules using the metadata associated with the list of media assets, such as the media asset metadata, the sequencing metadata, and the device placement metadata. The rules may span multiple different media spaces, multiple device types, or time. This allows orchestration service 106 to orchestrate the delivery of cross device media assets.

The specification of the media asset metadata, the sequencing metadata, and the device placement metadata allows orchestration service 106 to formulate rules that can be used to orchestrate the delivery of media assets. For example, the sequencing information and constraint information from the metadata forms the rules. Some constraints may be explicitly specified (e.g., this offer only lasts 24 hours), whereas orchestration service 106 may infer some rules (e.g., if the target client device is a smartphone, then the media assets need to have some minimum/maximum media constraints, such as resolution and compatibility). Orchestration service 106 may form the metadata into rules that can be evaluated. The rules engine executes the rules based on a status of the campaign, such as where in the sequence of the campaign a user is currently at, and any timing information for the current status. That is, the rules engine may evaluate the analytics information for delivery of media assets for the campaign in association with the rules to determine when to send the media assets from cross-device ad inventory 204. Feedback from client devices 104 may be used by orchestration service 106 in subsequent evaluation of rules and also be used to change the metadata or rules for the campaign if the analytics indicates a different sequence might be better.

Placement opportunity service 206 determines when there is an opportunity for placement of a media asset. For example, placement opportunity service 206 may include ad targeting services that determine characteristics for placing a media asset on a client device 104. In one embodiment, placement opportunity service 206 may determine an opportunity to place an advertisement targeted to young adults within a television show. Other opportunities may be placement opportunities on a mobile device application. Placement opportunity service 206 notifies orchestration service 106 of the placement opportunities.

Once the rules are set, orchestration service 106 may deliver media assets according to the rules when placement opportunities arise. For example, orchestration service 106 evaluates a rule based on the current status of the campaign and determines whether a media asset can be placed in the placement opportunity. The orchestration service will now be described in more detail.

Orchestration Service

Figure 3:
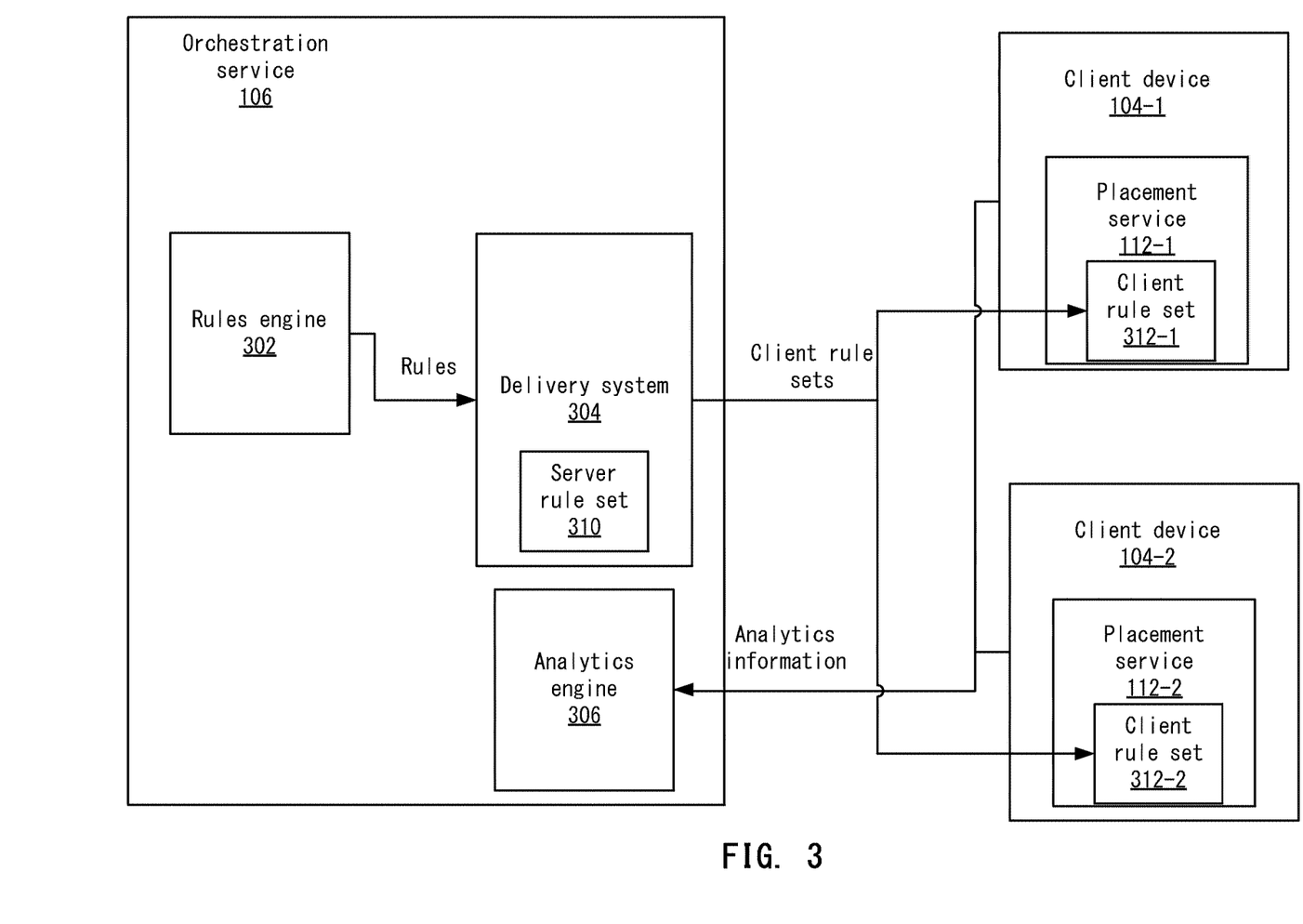
FIG. 3 shows a more detailed example of an orchestration service according to one embodiment.

FIG. 3 shows a more detailed example of orchestration service 106 according to one embodiment. Orchestration service 106 includes a rules engine 302, a delivery system 304, and an analytics engine 306.

Rules engine 302 receives media asset metadata from cross-device ad inventory 204, and sequencing metadata and device type metadata from campaign manager 202 for a list of media assets. Orchestration service 106 can then select media assets from cross-device inventory 204 that meet the sequencing metadata and device type metadata from campaign manager 202 for the campaign.

Rules engine 302 analyzes the metadata to generate rules that span multiple media spaces for orchestration service 106. For example, the sequencing metadata for the set of media assets may specify the sequence in which media assets should be displayed. Then, the device type metadata may specify on which devices that specific media assets should be run. Rules engine 302 can then generate rules that enforce the constraints from the metadata.

The rules may include rules to be executed on server 102, and rules to be executed on client devices 104-1 and 104-2. These rules coordinate the delivery and display of each media asset in the correct sequence based on the evaluation of the rules among orchestration system 106 and client devices 104. For example, rules engine 302 delivers rules to delivery system 304 to orchestrate the delivery of media assets to client devices 104. Delivery system 304 may store a server rule set 310 needed by orchestration service 106 to deliver the media assets. Further, delivery system 304 may send different client rule sets 312 to different client devices 104. The client rule sets 312 may be stored by respective media asset placement services 112 in client devices 104. The client rule sets 312 are used in coordination with the server rule sets 310 stored in delivery system 304 to orchestrate the delivery of media assets.

Media asset placement services 112 in client devices 104 may be implemented at the application level or operating system level. At the application level, the application may be used to implement a client rule set 312 for the specific application. At the operating system level, client rule set 312 can be used on a global basis across many applications.

Delivery system 304 uses server rule set 310 to determine when to deliver media assets and to which client devices 104. For example, when a placement opportunity on a device occurs, delivery system 304 may review server rule set 310 to determine if a current media asset in the sequence should be delivered in this placement opportunity. For discussion purposes, in an illustrative example according to an embodiment, this may be the first media asset in the sequence for a campaign, which may be a 30-second television advertisement that is sent to client device 104-1.

Client device 104-1 may display the television advertisement while a user is watching a television show. Media asset placement service 112-1 then uses a client rule set 312-1 to determine an actions to perform. For example, the display of the television advertisement may just require sending a confirmation to analytics engine 306 that the user has watched the 30-second television ad. Analytics engine 306 may be integrated with delivery system 304 such that the confirmation is noted by delivery system 304 or the confirmation may go directly to delivery system 304.

Once delivery system 304 receives the confirmation, delivery system 304 may review server rule set 310 to determine if delivery of another media asset in the sequence has been triggered. The specific server rule in this case may span multiple spaces. That is, the viewing of the television ad may trigger another media asset to be sent in another space. For example, a second media asset in the sequence may be a 60-second video advertisement on a mobile device, such as client device 104-2. When a device placement opportunity occurs on client device 104-2, delivery system 304 may send the 60-second video advertisement to client device 104-2. Then, when a user watches the 60-second video ad, media asset placement service 112-2 uses client rule set 312-2 to determine an action to perform. This action may be to provide a cash offer of $1,000 off a product to the user. Media asset placement service 112-2 may then output this offer to the user. Further, media asset placement service 112-2 may also send a confirmation back to analytics engine 306 that the second media asset has been viewed and the offer has been provided to the user.

Client rule set 312-2 may also include further rules regarding offers in other spaces. For example, if a user downloads an application related to the product onto client device 104-2 within a time period, such as within 24 hours of watching either the television ad or the 60-second video, a new offer of $2,500 off the product may be provided. Because this action may occur on client 104-2 without interaction with orchestration service 106, client rule set 312-2 is configured to recognize this action. In this case, media asset placement service 112-2 may be installed in client device 104-2 such that global access to actions on client device 104-2 can be monitored. Once this action is detected, media asset placement service 112-2 may either trigger the new offer or communicate with orchestration service 106 to have the offer provided to client device 104-2.

The confirmations from client devices 104 may be used by analytics engine 306 to adjust the server rule set 310, or any client rule sets 312. In one example, the confirmations may change the order of the sequence of delivery in the rules being evaluated. For example, if the confirmations indicate that a social network video is being consumed and then the application is downloaded without watching the 60-second video advertisement, then the sequence may be changed to allow users to take advantage of the $2,500 off incentive without requiring watching the 60-second video if the application is downloaded.

Also, the analytics information may be used to determine when campaigns do not finish. For example, not all media assets in the sequence may be delivered because of various reasons. This information may be aggregated and provide via a dashboard for analysis.

Rules Example

Figure 4:
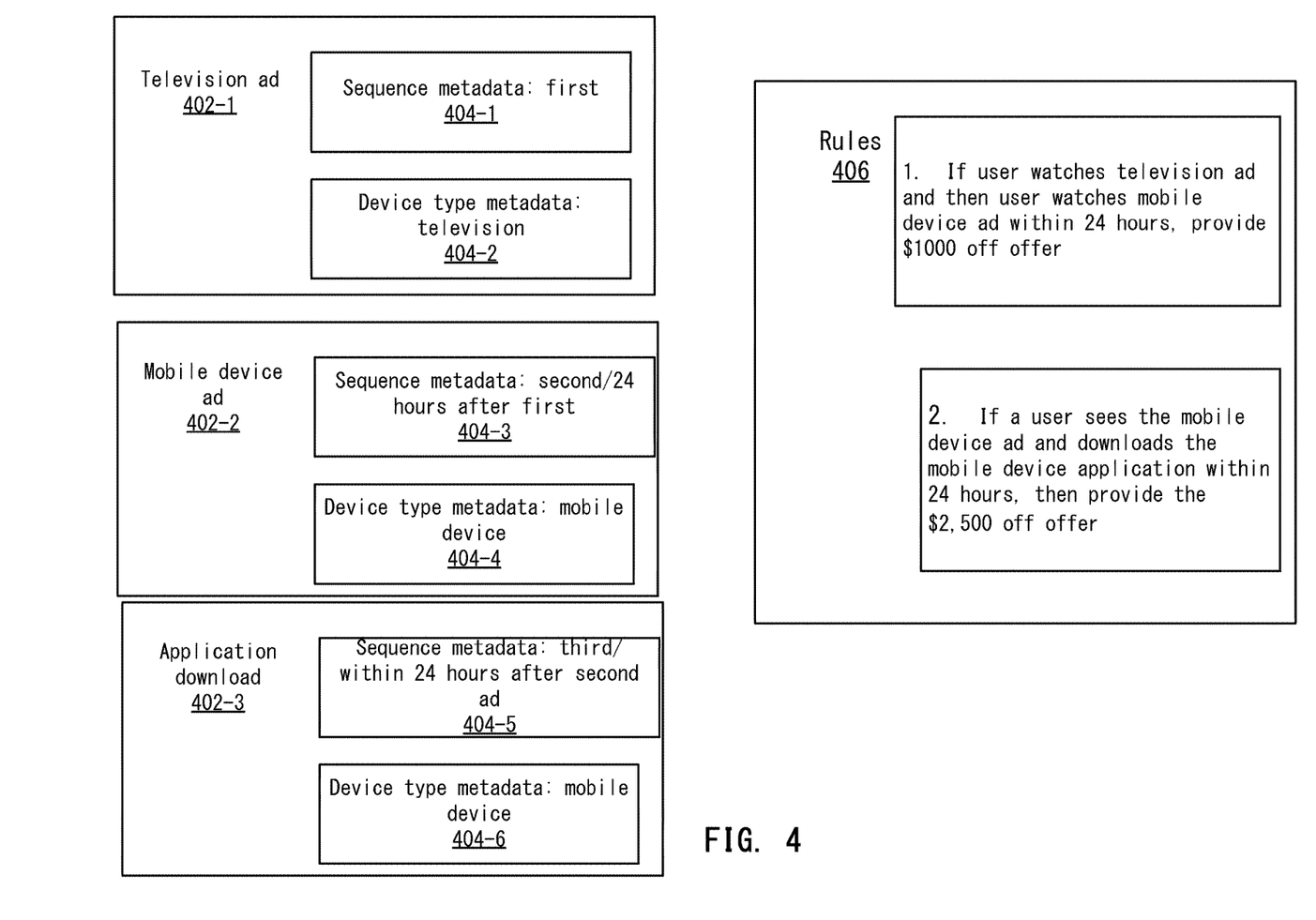
FIG. 4 depicts an example of the rules generation according to one embodiment.

FIG. 4 depicts an example of the rules generation according to one embodiment. A first media asset 402-1 may be a television ad in a television media space. At 404-1, sequencing metadata for the television ad indicates that this ad should be first in the sequence of this campaign and at 404-2, the device type should be that it is shown on the television. At 402-2, a media asset is a mobile device ad in a mobile media space. At 404-3, the sequencing metadata for this mobile device ad indicates that this ad is second in the sequence and should be sent within 24 hours after the television ad is watched. Also, at 404-4, the device type should be a mobile device. Other mobile device parameters may also be provided, such as the type of operating system. A third media asset at 402-3 is an application download in an application media space. Sequencing metadata at 404-5 indicates that this download is third in the sequence and should be downloaded within 24 hours after viewing the mobile device ad. The device type may also be mobile in this case as shown at 404-6.

Rules engine 302 may evaluate this metadata 404-1 404-6 and generate rules shown at 406. In an illustrative example, according to an embodiment: A rule #1 may indicate that if a user watches the television ad and then the user watches the mobile device ad 24 hours after watching the television ad, then provide an offer of $1,000 off the product. A rule #2 is if a user sees the mobile device ad and downloads the mobile device application within 24 hours, then provide the $2,500 off offer. These rules (or a subset) are stored for evaluation by delivery system 304 and client devices 104. As shown, the rules may span multiple media spaces and different types of devices.

Method Flows

Figure 5:
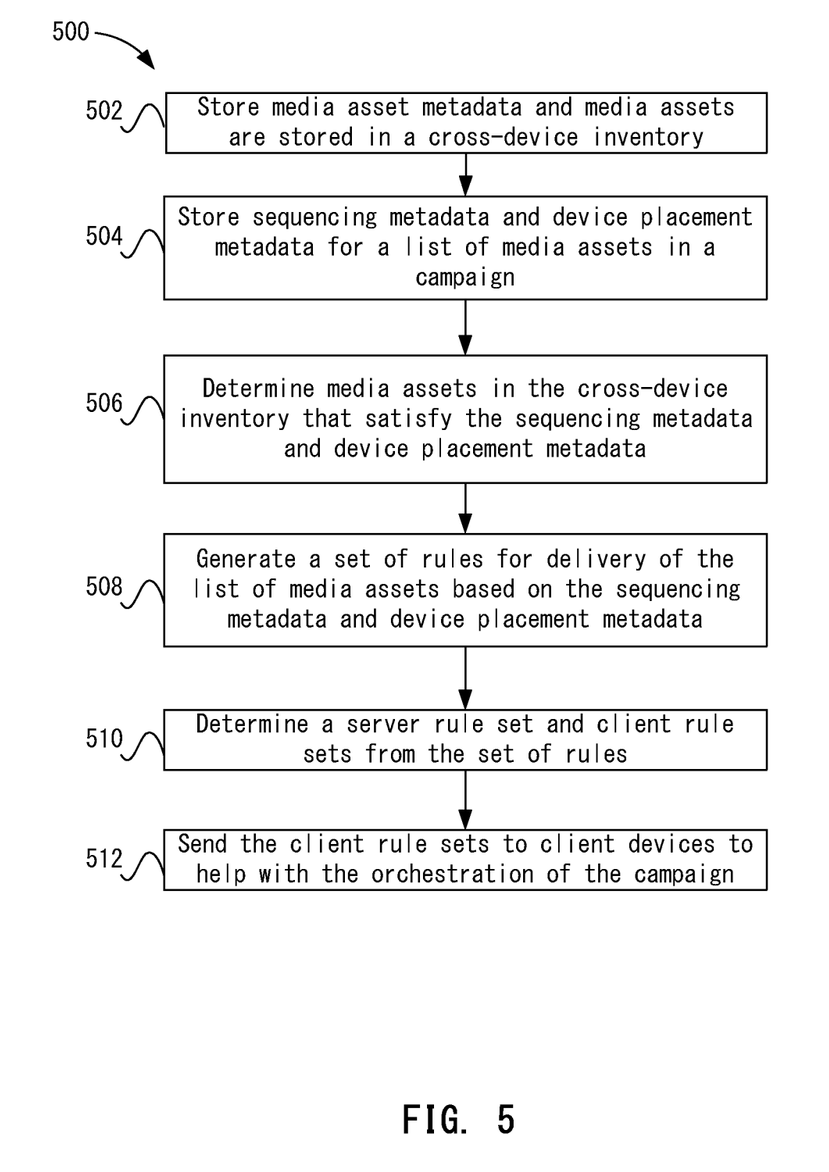
FIG. 5 depicts a flowchart of a method for preparing a campaign for orchestration according to one embodiment.

FIG. 5 depicts a flowchart 500 of a method for preparing a campaign for orchestration according to one embodiment. At 502, media asset metadata and media assets are stored in cross-device inventory 204. Also, at 504, sequencing metadata and device placement metadata for a list of media assets in a campaign are stored.

At 506, orchestration service 106 determines media assets in cross-device inventory 204 that satisfy the sequencing metadata and device placement metadata. Then, at 508, orchestration service 106 generates a set of rules for delivery of the list of media assets based on the sequencing metadata and device placement metadata. The set of rules include a set of timing constraints based on the sequence of delivery and a set of device type constraints that enforce the sequence of delivery for the list of media assets across the multiple media spaces and different device types.

At 508, orchestration service 106 can determine a server rule set 310 and client rule sets 312 from the set of rules. At 510, orchestration service 106 sends the client rule sets to client devices 104 to help with the orchestration of the campaign.

Figure 6:
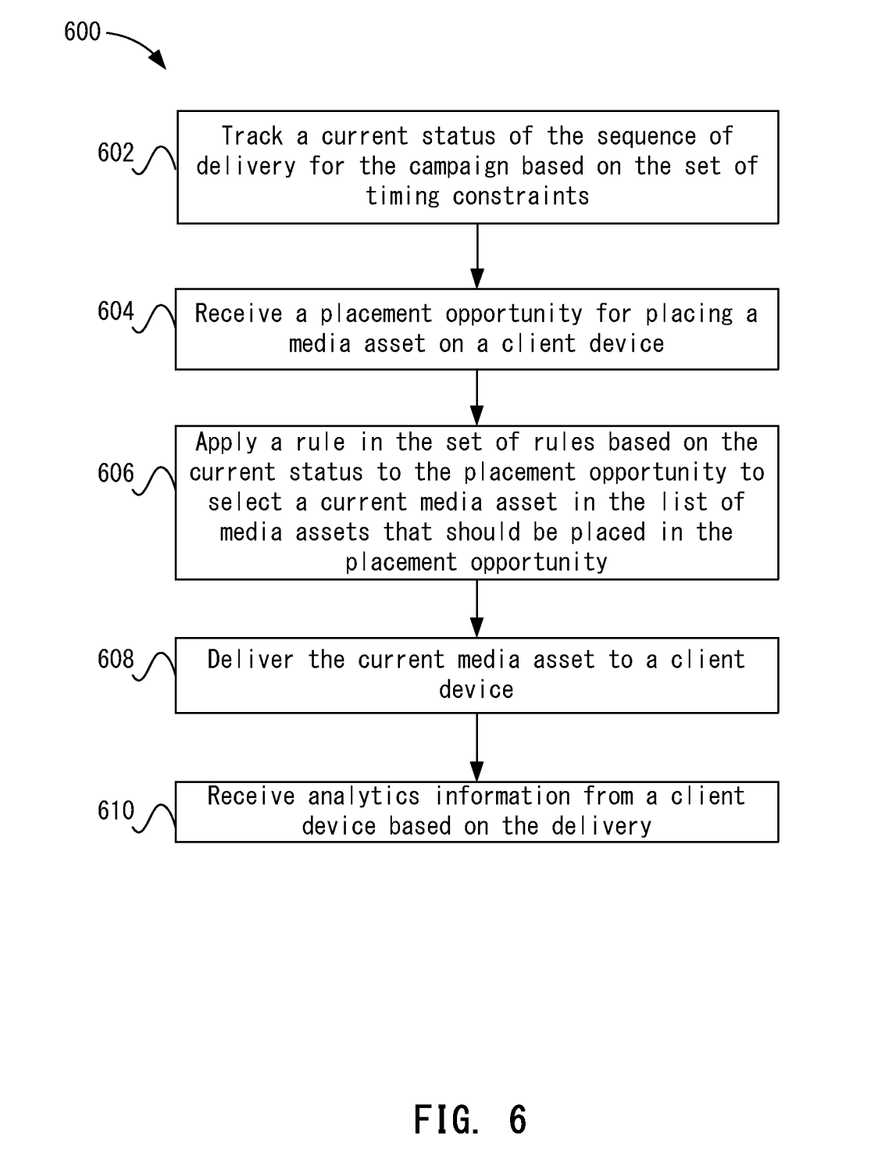
FIG. 6 depicts a flowchart of a method for orchestrating media assets according to one embodiment.

FIG. 6 depicts a flowchart 600 of a method for orchestrating media assets according to one embodiment. At 602, orchestration service 106 tracks a current status of the sequence of delivery for the campaign based on the set of timing constraints. For example, the current status depending on which media assets have already been delivered in the campaign and possibly an elapsed time since one media asset has been delivered.

At 604, orchestration service 106 receives a placement opportunity for placing a media asset on a client device 104. At 606, orchestration service 106 applies a rule in the set of rules based on the current status to the placement opportunity to select a current media asset in the list of media assets that should be placed in the placement opportunity. Then, at 608, orchestration service 106 delivers the current media asset to a client device. This satisfies a device type constraint in the set of device type constraints and a timing constraint in the set of timing constraints for the rule. Once delivered, at 610, orchestration service 106 receives analytics information from client device 104 based on the delivery.

Example Computer System

Figure 7:
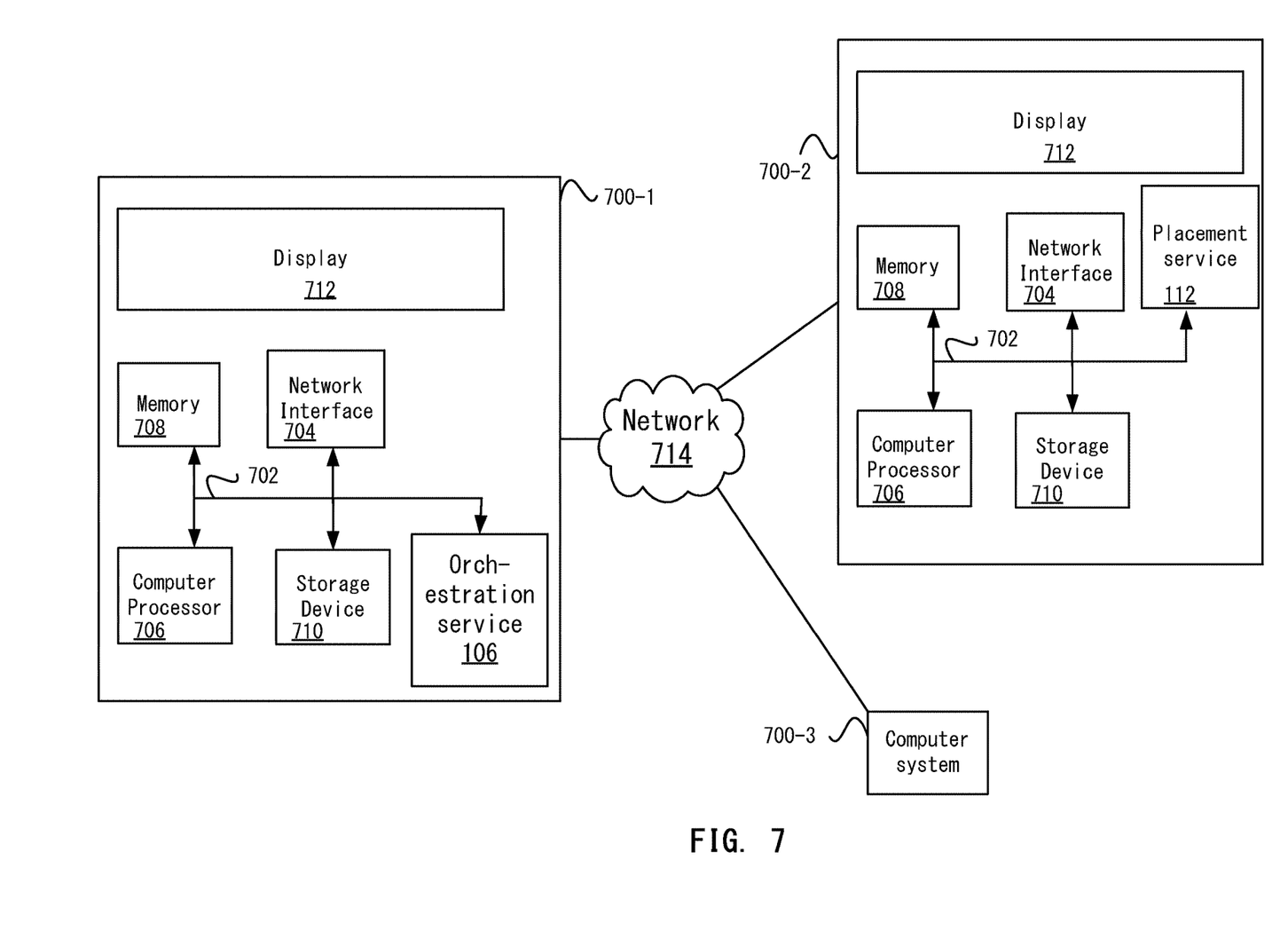
FIG. 7 illustrates an example of a special purpose computer systems configured with an orchestration service and media asset placement service according to one embodiment.

FIG. 7 illustrates an example of a special purpose computer systems 700-1-700-3 configured with orchestration service 106 and media asset placement service 112 according to one embodiment. In one embodiment, computer system 700-1 describes server 102. Also, computer system 700-2 describes client 104-1 or 104-2. Only one instance of computer system 700 will be described for discussion purposes, but it will be recognized that computer system 700 may be implemented for other entities described above, such as [other entities].

Computer system 700 includes a bus 702, network interface 704, a computer processor 706, a memory 708, a storage device 710, and a display 712.

Bus 702 may be a communication mechanism for communicating information. Computer processor 706 may execute computer programs stored in memory 708 or storage device 708. Any suitable programming language can be used to implement the routines of particular embodiments including C, C++, Java, assembly language, etc. Different programming techniques can be employed such as procedural or object oriented. The routines can execute on a single computer system 700 or multiple computer systems 700. Further, multiple computer processors 706 may be used.

Memory 708 may store instructions, such as source code or binary code, for performing the techniques described above. Memory 708 may also be used for storing variables or other intermediate information during execution of instructions to be executed by processor 706. Examples of memory 708 include random access memory (RAM), read only memory (ROM), or both.

Storage device 710 may also store instructions, such as source code or binary code, for performing the techniques described above. Storage device 710 may additionally store data used and manipulated by computer processor 706. For example, storage device 710 may be a database that is accessed by computer system 700. Other examples of storage device 710 include random access memory (RAM), read only memory (ROM), a hard drive, a magnetic disk, an optical disk, a CD-ROM, a DVD, a flash memory, a USB memory card, or any other medium from which a computer can read.

Memory 708 or storage device 710 may be an example of a non-transitory computer-readable storage medium for use by or in connection with computer system 700. The non-transitory computer-readable storage medium contains instructions for controlling a computer system 700 to be configured to perform functions described by particular embodiments. The instructions, when executed by one or more computer processors 706, may be configured to perform that which is described in particular embodiments.

Computer system 700 includes a display 712 for displaying information to a computer user. Display 712 may display a user interface used by a user to interact with computer system 700.

Computer system 700 also includes a network interface 704 to provide data communication connection over a network, such as a local area network (LAN) or wide area network (WAN). Wireless networks may also be used. In any such implementation, network interface 704 sends and receives electrical, electromagnetic, or optical signals that carry digital data streams representing various types of information.

Computer system 700 can send and receive information through network interface 704 across a network 714, which may be an Intranet or the Internet. Computer system 700 may interact with other computer systems 700 through network 714. In some examples, client-server communications occur through network 714. Also, implementations of particular embodiments may be distributed across computer systems 700 through network 714.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
    receiving, by a computing device, a list of media assets from an advertiser for a campaign for targeting multiple media spaces, the campaign including first metadata defining a sequence of delivery for the list of media assets and second metadata regarding device placement constraints for the campaign;
    formulating, by the computing device, a set of rules that enforce the sequence of delivery for the list of media assets across the multiple media spaces and different device types for delivery of the media assets in the defined sequence to one or more devices associated with a client, wherein the set of rules includes:
        a set of timing constraints based on the sequence of delivery in the first metadata including a time and or duration of time a media asset in the list of media assets is eligible for delivery and
        a set of device type constraints based on the device placement constraints for the second metadata including a type of device type that is eligible for placement of one or more media assets in the list of media assets for the campaign;
    for the campaign, storing information specifying the sequence of delivery for each of the media assets for the campaign and the set of the timing constraints for the media assets and the set of device type constraints;
    tracking, by the computing device, a current status of the delivery of media assets for the campaign to the one or more devices associated with the client;
    determining a placement opportunity for delivery of a second media asset in the list of media assets within the campaign to the one or more devices associated with the client;
    for the placement opportunity, applying, by the computing device, a rule in the set of rules to the current status of the delivery of media assets for the campaign to select a current media asset in the list of media assets that should be placed in the placement opportunity, wherein said selection is based on the timing constraints and device placement constraints associated with the placement opportunity;
    selecting the current media asset from the list of media assets for the campaign that meets a timing constraint in the set of timing constraints and meets a device type constraint in the set of device type constraints;
    delivering, by the computing device, the current media asset to a client device for the placement opportunity, the delivering satisfying a device type constraint in the set of device type constraints and a timing constraint in the set of timing constraints for the rule, wherein the client device receives the current media asset while the client device is in use.

2. The method of claim 1, further comprising:
    receiving analytics information regarding the delivering of the current media asset; and
    using the analytics information in delivering a next media asset in the list of media assets.

3. The method of claim 2, wherein using the analytics information comprises:
    changing the set of timing constraints in the set of rules based on the analytics information.

4. The method of claim 2, wherein using the analytics information comprises:
    updating the current status of the sequence of delivery based on the analytics information.

5. The method of claim 1, wherein the client device comprises a first client device, the method further comprising:
    sending a first portion of the set of rules to the first client device for a user; and
    sending a second portion of the set of rules to a second client device for the user, wherein the first client device uses the first portion of the set of rules and the second client device uses the second portion of the set of rules to track the current status.

6. The method of claim 5, wherein the first client device uses the first portion of the set of rules or the second client device uses the second portion of the set of rules to send analytics information for the current status to the computing device.

7. The method of claim 6, further comprising:
    updating the current status based on the analytics information sent by the first client device using the first portion of the set of rules or the second client device using the second portion of the set of rules.

8. The method of claim 5, wherein the first client device uses the first portion of the set of rules or the second client device uses the second portion of the set of rules to output an offer from the campaign.

9. The method of claim 1, further comprising:
receiving the placement opportunity;
determining the rule based on the current status; and
matching the current media asset to the placement opportunity by evaluating the rule according to the timing constraint and the device type constraint for the rule.

10. The method of claim 9, wherein matching comprises:
using timing information related to the current media asset to prioritize selecting of the current media asset for the placement opportunity.

11. The method of claim 10, further comprising:
storing an elapsed time as the timing information related to the current media asset, wherein the elapsed time is based on how long the current media asset has been eligible for delivery in the sequence of delivery.

12. The method of claim 10, further comprising:
storing a time to live as the timing information related to the current media asset, wherein the time to live is based on how long the current media asset will be eligible for delivery in the sequence of delivery.

13. The method of claim 9, wherein the placement opportunity comprises a first placement opportunity, the rule comprises a first rule, the client device comprises a first client device, the timing constraint comprises first timing constraint, and the device type constraint comprises a first device type constraint, the method further comprising:
receiving a second placement opportunity;
matching a next media asset in the list of media assets in the sequence of delivery to the second placement opportunity by evaluating a second rule according to a second timing constraint and a second device type constraint for the second rule; and
delivering the next media asset to a second client device.

14. The method of claim 1, further comprising:
retrieving media assets from storage that includes a plurality of media assets, wherein the plurality of media assets include media asset metadata describing the retrieved media assets, and wherein the retrieved media assets have media asset metadata that satisfies the first metadata and the second metadata.

15. The method of claim 1, further comprising:
storing analytics information that indicates that not all of the list of media assets were delivered in the sequence of delivery.

16. The method of claim 1, wherein the current status comprises a position in the sequence of delivery and timing information related to the timing constraint for the current media asset.

17. An apparatus comprising:
one or more computer processors; and
a non-transitory computer-readable storage medium comprising instructions that, when executed, control the one or more computer processors to be configured for:
receiving a list of media assets from an advertiser for a campaign for targeting multiple media spaces, the campaign including first metadata defining a sequence of delivery for the list of media assets and second metadata regarding device placement constraints for the campaign;
formulating a set of rules that enforce the sequence of delivery for the list of media assets across the multiple media spaces and different device types for delivery of the media assets in the defined sequence to one or more devices associated with a client, wherein the set of rules includes:
a set of timing constraints based on the sequence of delivery in the first metadata including a time and or duration of time a media asset in the list of media assets is eligible for delivery and
a set of device type constraints based on the device placement constraints for the second metadata including a type of device type that is eligible for placement of one or more media assets in the list of media assets for the campaign;
for the campaign, storing information specifying the sequence of delivery for each of the media assets for the campaign and the set of the timing constraints for the media assets and the set of device type constraints;
tracking a current status of the delivery of media assets for the campaign to the one or more devices associated with the client;
determining a placement opportunity for delivery of a second media asset in the list of media assets within the campaign to the one or more devices associated with the client;
for a placement opportunity, applying a rule in the set of rules to the current status of the delivery of media assets for the campaign to select a current media asset in the list of media assets that should be placed in the placement opportunity, wherein said selection is based on the timing constraints and device placement constraints associated with the placement opportunity;
selecting the current media asset from the list of media assets for the campaign that meets a timing constraint in the set of timing constraints and meets a device type constraint in the set of device type constraints;
delivering the current media asset to a client device for the placement opportunity, the delivering satisfying a device type constraint in the set of device type constraints and a timing constraint in the set of timing constraints for the rule, wherein the client device receives the current media asset while the client device is in use.

18. A system comprising:
a client device configured to be communicatively coupled to a server that comprises:
one or more first computer processors; and
a first non-transitory computer-readable storage medium comprising instructions that, when executed, control the one or more first computer processors to be configured for:
receiving a list of media assets from an advertiser for a campaign for targeting multiple media spaces, the campaign including first metadata defining a sequence of delivery for the list of media assets and second metadata regarding device placement constraints for the campaign;
formulating a set of rules that enforce the sequence of delivery for the list of media assets across the multiple media spaces and different device types for delivery of the media assets in the defined sequence to one or more devices associated with a client, wherein the set of rules includes:
a set of timing constraints based on the sequence of delivery in the first metadata including a time and or duration of time a media asset in the list of media assets is eligible for delivery and
a set of device type constraints based on the device placement constraints for the second metadata including a type of device type that is eligible for placement of one or more media assets in the list of media assets for the campaign;

for the campaign, storing information specifying the sequence of delivery for each of the media assets for the campaign and the set of the timing constraints for the media assets and the set of device type constraints;

tracking a current status of the delivery of media assets for the campaign to the one or more devices associated with the client;

determining a placement opportunity for delivery of a second media asset in the list of media assets within the campaign to the one or more devices associated with the client;

for a placement opportunity, applying a rule in the set of rules to the current status of the delivery of media assets for the campaign to select a current media asset in the list of media assets that should be placed in the placement opportunity, wherein said selection is based on the timing constraints and device placement constraints associated with the placement opportunity;

selecting the current media asset from the list of media assets for the campaign that meets a timing constraint in the set of timing constraints and meets a device type constraint in the set of device type constraints;

delivering the current media asset to a client device for the placement opportunity, the delivering satisfying a device type constraint in the set of device type constraints and a timing constraint in the set of timing constraints for the rule, wherein the client device receives the current media asset while the client device is in use;

the client device comprising:
one or more second computer processors; and
a second non-transitory computer-readable storage medium comprising instructions that, when executed, control the one or more second computer processors to be configured for:
receiving a portion of the set of rules;
receiving the current media asset; and
using the portion of the set of rules to track the current status based on the receiving of the current media asset.

19. The system of claim 18, wherein the client device is configured for:
sending analytics information regarding the receiving of the current media asset to the server for tracking the current status.

20. The system of claim 18, wherein the client device is configured for:
outputting an offer for the campaign based on evaluating the portion of the set of rules and the receiving of the current media asset.

* * * * *